United States Patent [19]

Pirkle

[11] 4,454,759

[45] Jun. 19, 1984

[54] FUEL GAUGE FOR LOCOMOTIVES

[75] Inventor: Frederick L. Pirkle, Phoenixville, Pa.

[73] Assignee: Ogontz Controls Company, Willow Grove, Pa.

[21] Appl. No.: 376,303

[22] Filed: May 10, 1982

[51] Int. Cl.³ .................... G01F 23/02; G01F 23/14; G01L 7/20
[52] U.S. Cl. ........................ 73/299; 73/747; 73/756; 137/558; 116/276
[58] Field of Search .............. 73/299, 747, 756; 137/558; 116/276

[56] References Cited

U.S. PATENT DOCUMENTS

| | | | |
|---|---|---|---|
| 2,068,135 | 1/1937 | Howse | 73/299 |
| 2,286,919 | 6/1942 | McNeill | 73/299 |
| 2,483,914 | 10/1949 | Lawson | 73/747 |
| 4,084,435 | 4/1978 | Weik et al. | 73/299 |
| 4,182,178 | 1/1980 | Nolte | 73/299 |

FOREIGN PATENT DOCUMENTS 497925 12/1938 United Kingdom ................. 73/299

Primary Examiner—Daniel M. Yasich
Attorney, Agent, or Firm—Richard D. Weber

[57] ABSTRACT

A fuel gauge for locomotives comprises a block adapted for attachment to the locomotive fuel tank near the bottom thereof, preferably by connection with a tank drain plug. First and second chambers in the block are joined by a passage connecting the lower ends thereof and serve as a reservoir for an indicator liquid having a density greater than that of the fuel to be gauged and being immiscible with respect thereto. Valve-controlled passage means connects the interior of the tank with the upper end of the first of said chambers, permitting fuel to enter the first chamber and form an interface with said indicator liquid. A gauge glass connected with the upper end of the second of said chambers in conjunction with a gauge scale provides a visual indication of the quantity of fuel in the tank.

22 Claims, 7 Drawing Figures

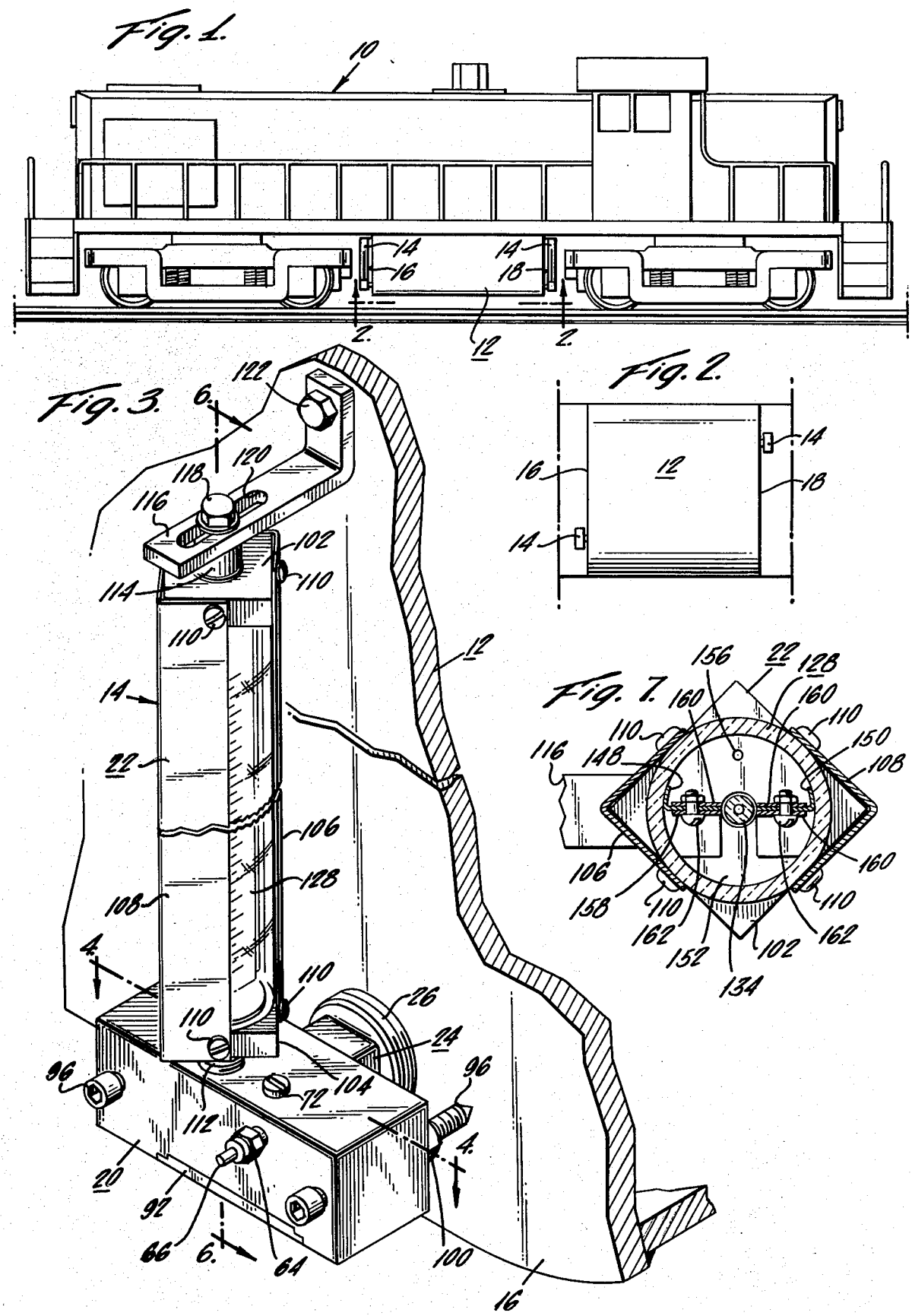

FUEL GAUGE FOR LOCOMOTIVES

BACKGROUND OF THE INVENTION

Diesel powered railroad locomotives are characterized by extremely large fuel tanks which typically hold three or four thousand gallons of diesel fuel. The tanks are usually located beneath the frame and between the trucks, and may extend the full width of the locomotive. The shape of the tanks is usually somewhat irregular to fit the space available and to accommodate other locomotive components.

Fuel tank gauges on locomotives are usually located on or adjacent the tanks themselves and are thus convenient to the fueling crew. The high cost of fuel has increased the importance of accurately gauging the fuel quantity in a locomotive tank, particularly in those situations in which a locomotive passes on a long haul run from the operating control of one railroad to that of another. Under such circumstances, the fuel quantity carried by the engine at the time of transfer is carefully recorded and the operating costs for the respective companies apportioned accordingly. An accurate, reliable and easily read fuel gauge for locomotive fuel tanks is, for such purposes, a necessity.

In older diesel locomotives, the fuel gauge comprised a sight glass similar to those employed with steam boilers. Such gauges were fragile and, if broken, resulted in fuel leakage until the breakage was discovered. Furthermore, the interior surface of the gauge glass after a period of use became coated with fuel oil and the actual fuel level was difficult to read.

A later development utilized the principal of the sight glass but comprised essentially a slot in the side of the tank into which a glass gauge plate was inserted by means of a suitable seal assembly. Gauges of this type typically extended along only a portion of the tank wall. Although such types of gauges were less subject to damage than those utilizing a totally exposed sight glass, nonetheless breakage could occur and the replacement of the gauge required the emptying of the tank and the expensive job of removing and replacing the seals and gauge glass. Furthermore, such gauges also become fouled with oil residue and the fuel level can be difficult to locate due to the flush mounting of the gauge glass.

Because of the difficulties in reading the conventional sight glass or gauge glass arrangement described, a refinement of the sight glass was developed which utilizes a transparent plastic rod to receive light from a flashlight to illuminate the gauge. Gradations along the column appear differently above and below the fuel level line to enhance the correct reading of the fuel level. A gauge of this type is shown, for example, in U.S. Pat. No. 2,514,570.

Another form of locomotive fuel gauge utilizes a float arm within the tank coupled by a gear linkage to a dial type meter mounted in a sealed assembly in the side of the tank. Such arrangements suffer the serious disadvantage of difficulty of repair, because of the internal mounting of the mechanism as well as the increased complexity of the gauge in contrast to the simpler sight glass type arrangement.

Still another type of gauge which if desired can be mounted remotely from the tank, utilizes an indicator liquid distinct from the tank liquid and senses the level of the tank liquid by application of a pressurized gas, usually air, which is directed through a tube and permitted to bubble into the tank contents at an outlet of the tube near the bottom of the tank. The pressure required to bubble air through this outlet, which pressure is proportional to the tank liquid level, is sensed by the remote meter carrying the indicator liquid, the gauge scale of which is calibrated to read the quantity of tank liquid.

Such a system, although widely used in many fields for tank level monitoring, is somewhat complex for locomotive service and suffers the disadvantage of requiring a source of pressurized gas as well as means for applying the gas pressure each time a reading is taken. The failure to apply the gas pressure or to apply sufficient pressure to bubble gas through the tank liquid could result in an erroneous reading of the tank contents.

From the foregoing brief description of the variety of locomotive fuel gauges presently in use, it can be understood that none of the present designs has been deemed sufficiently superior to cause the others to be regarded as outmoded.

It is accordingly a first object the present invention to provide a locomotive fuel gauge which provides an accurate and easily read indication of the fuel quantity in the tank.

Another object of the invention is to provide a gauge as described of a rugged, reliable and relatively simple construction which is economical to make and install.

A still further object of the invention is to provide a gauge as described which can be easily and quickly retrofitted to existing locomotives without any modification of locomotive fuel tanks.

Still another object of the invention is to provide a gauge as described which can be easily, quickly and inexpensively repaired if damaged without draining the tank.

Still another object of the invention is to provide a gauge as described which if damaged will result in only a negligible fuel loss, even if the damage is not discovered for a period of time.

BRIEF SUMMARY OF THE INVENTION

The present invention includes a gauge block containing first and second chambers which is mounted exteriorly of the tank adjacent the bottom thereof and may conveniently be attached to a modified tank drain plug. The first and second chambers of the block are connected by means of a passage joining the lower ends thereof and are filled with an indicator fluid having a specific gravity greater than that of the fuel in the tank and immiscible with respect thereto. Passage means in the block controlled by a valve connect the upper end of the first of said chambers with the interior of the tank. A gauge glass mounted above the block communicates with the upper end of the second chamber so that the indicator fluid will rise in the gauge glass in accordance with the pressure exerted on the indicator fluid in the first chamber by the fuel. Since the fuel pressure in the first chamber is determined by the fuel level in the tank, the gauge glass indicator fluid level provides an accurate indication of the fuel level in the tank. By use of an appropriately calibrated gauge scale, the fuel quantity may be read directly, even with irregularly shaped tanks. A liquid check valve at the upper end of the gauge glass prevents loss of indicator fluid in the event of a tank pressure surge during tank filling.

The gauge glass is preferably a capillary tube and since the quality of indicator fluid in the tube will change very slightly as the fuel quantity in the tank changes, the fuel flow passage into the first chamber may be extremely small. Accordingly, any damage to the gauge resulting in a flow of fuel through the block would result only in a negligible rate of fuel loss.

The invention further comprises a novel form of gauge assembly wherein the capillary gauge glass is protected by a surrounding cylindrical shield of armor glass, the viewing sections of which may be selectively changed by rotation of the glass to provide a clean viewing window.

DESCRIPTION OF THE DRAWINGS

FIG. 1 is a schematic side elevational view of a locomotive illustrating the typical location of the locomotive fuel tank and showing a pair of fuel gauges mounted on the fuel tank in accordance with the present invention;

FIG. 2 is a schematic bottom view of the locomotive fuel tank taken along line 2—2 of FIG. 1;

FIG. 3 is an enlarged broken perspective view of the fuel gauge of FIGS. 1 and 2, the tank adjacent the gauge being cut away;

FIG. 7 is a sectional view taken along line 7—7 of FIG. 6.

DESCRIPTION OF THE PREFERRED EMBODIMENT

Figure 4:
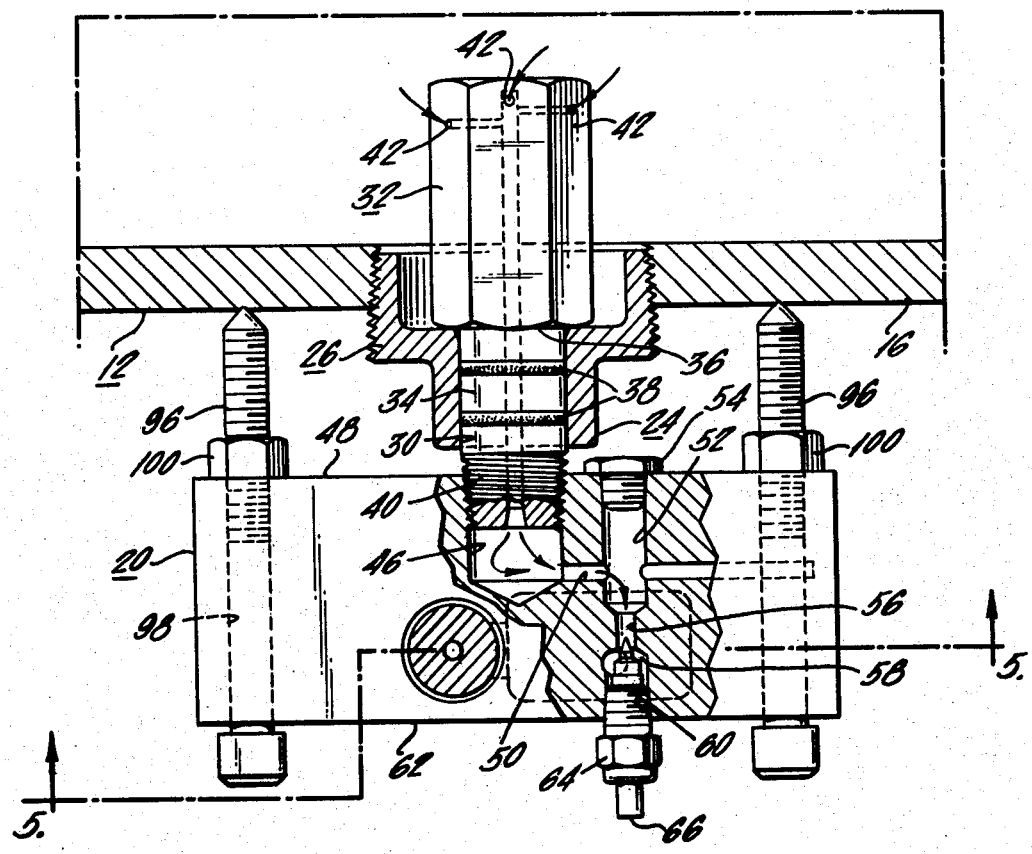
FIG. 4 is an enlarged sectional plan view with parts thereof broken away taken along line 4—4 of FIGS. 1-3.

Referring to the drawings and particularly FIG. 1 thereof, a locomotive generally designated 10 of a conventional diesel powered type is shown to illustrate the usual position of the fuel tank 12 which is suspended beneath the locomotive frame between the trucks thereof. As shown in FIG. 2, the tank 12 is typically rectangular in plan form and in the illustrated embodiment extends the full width of the locomotive. The exposed side walls of the tank typically curve downwardly and inwardly and may be quite irregular to accommodate external locomotive equipment such as air tanks and the like. The front and rear walls of the tank are typically vertical planar walls as illustrated.

A fuel gauge 14 in accordance with the present invention is mounted on both the front wall 16 and the rear wall 18 of the tank 12. The fuel gauges 14 are identical in construction and, as shown in FIG. 2, are preferably located in diametrically opposed relation on the front and rear walls 16 and 18 with respect to the center of the tank. The placement of the gauges on the front and rear walls 16 and 18 and their location on these walls at positions spaced inwardly from the exposed side walls of the tank provides some degree of protection to the gauges.

Referring to the detailed views of FIGS. 3-7, the fuel gauge 14 may be seen to comprise essentially two major components, a gauge block or housing 20 and a gauge glass assembly 22 extending vertically thereabove. In addition, the gauge assembly 14 includes means 24 for providing fluid connection between the block and the interior of the fuel tank 12.

Figure 6:
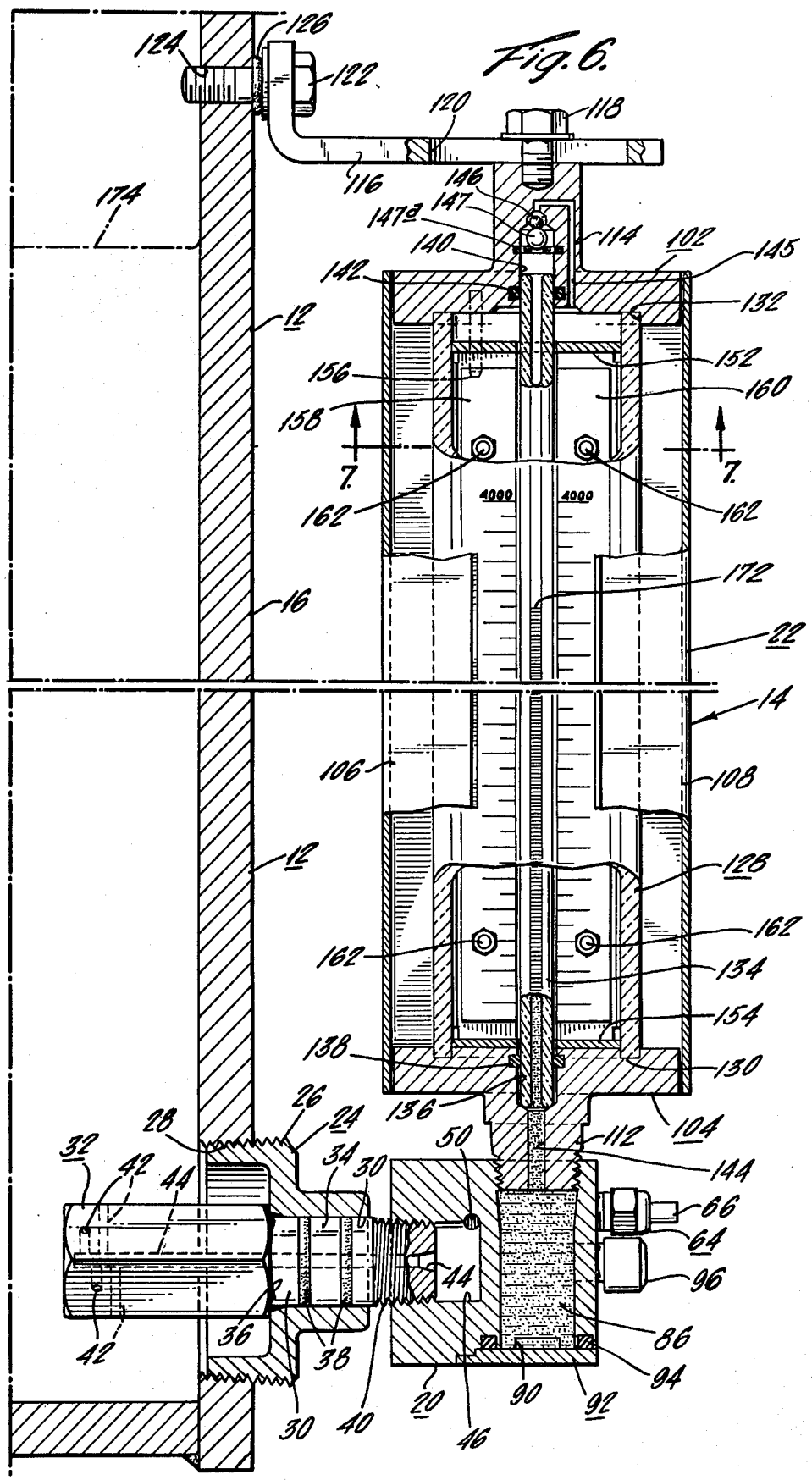
FIG. 6 is an enlarged sectional view taken along line 6—6 of FIG. 3.

To simplify the installation of the present gauge, the means 24 preferably comprises a drain plug 26 which is threadedly connected to a port 28 in the wall 16 of the tank near the bottom thereof. Since a typical locomotive fuel tank will include several sets of such plugs and ports, usually along the front and rear walls of the tank, the installation of the present gauge can be accomplished by means of a simple modification of one of the drain plugs 26. As shown in FIGS. 4 and 6, this modification comprises a concentric bore 30 in the drain plug.

The means 24 comprises a pressure pickup head 32 of hexagonal section havng a cylindrical neck portion 34 defining a shoulder 36. The neck portion 34 is inserted in the bore 30 of the plug 26 and sealed therewithin by means of seal rings 38, the shoulder 36 seating against the inner wall of the plug 26. An extending end of the neck portion 34 is provided with a tapered thread 40 for connection with the gauge block 20.

The inwardly extending pressure pickup head includes a plurality of radially directed holes 42 which communicate with a concentric central bore 44 therein. In the embodiment illustrated, a hole 42 is located in each of the hexagonal faces of the pressure pickup head 32. The holes 42 and the bore 44 may be quite small since the flow therethrough is extremely small, the passages serving to transmit the fuel pressure in the bottom of the tank to the block 20.

Figure 5:
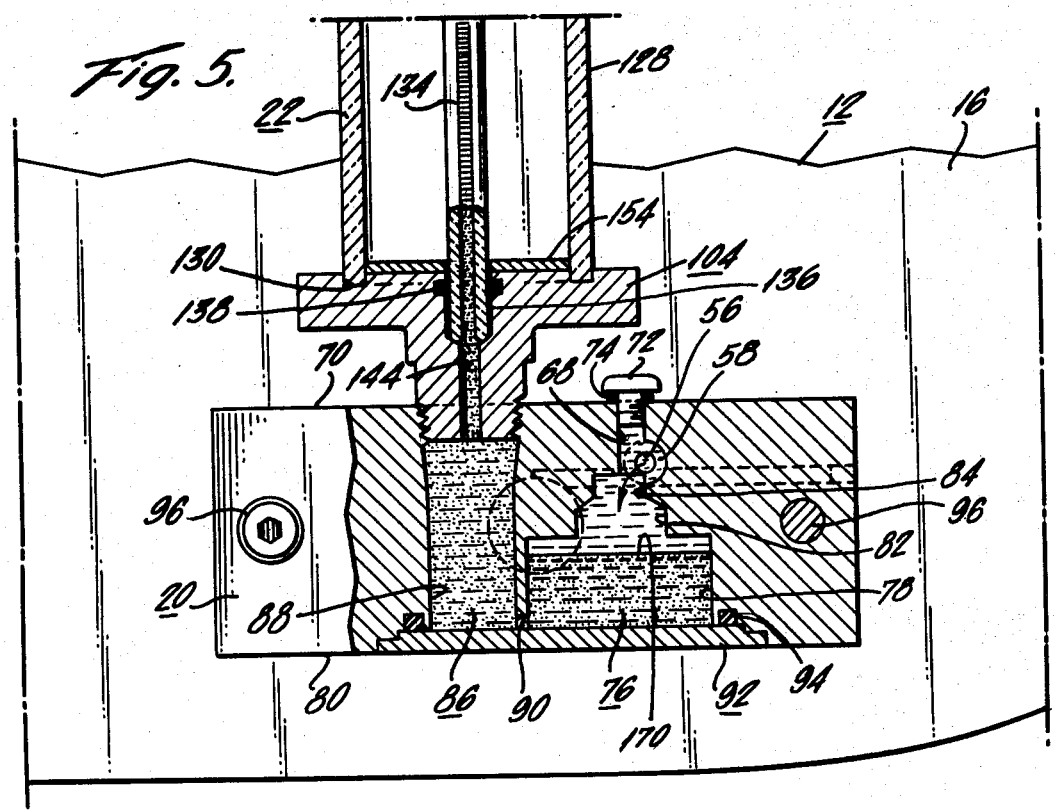
FIG. 5 is a view partly in section taken along line 5—5 of FIG. 4.

The details of the gauge block 20 are shown in particular in FIGS. 4-6 and comprise a horizontal bore 46 extending partway through the block from the rear face 48 thereof. The bore 46 is provided with a tapered thread for connection to the tapered thread 40 of the extending neck portion of the pickup head 32.

The bore 46 is joined by a connecting passage 50 to a parallel bore 52 extending from the rear face 48 of the block, the rear opening thereof being closed by a plug 54. The bore 52 extends inwardly in a narrow concentric passage 56 which opens into a valve chamber 58 formed by a bore 60 aligned therewith and entering the block from the front face 62 thereof. The intersection of the passage 56 with the valve chamber 58 forms a seat for a needle valve 64 which is threadedly disposed in the bore 60 and includes an operating shaft 66, the rotation of which opens and closes the needle valve and hence the communication of the passage 56 with the chamber 58.

As shown in FIG. 5, a vertical vent passage 68 extending downwardly from the top surface 70 of the block 20 intersects the valve chamber 58. A vent screw 72 provided with a seal ring 74 is threadedly secured in the upper end of the vent passage 68.

A first reservoir chamber 76 is formed in the block by a bore 78 extending partway thereinto from the bottom surface 80 of the block. The chamber 76 at its upper end communicates with the valve chamber 58 and the vent passage 68 through a concentric succession of narrower bores 82 and 84.

A second reservoir chamber 86 is formed by a vertical bore 88 extending through the block from the bottom surface 80 to the top surface 70. The upper end of the bore 88 is provided with a tapered thread for the sealing attachment of the gauge glass assembly 22. The lower end of the second chamber 86 communicates with the lower end of the first chamber 76 by means of a fluid passage 90 as shown in FIG. 5.

A cover plate 92 set into the bottom surface 80 of the block and provided with a peripheral seal ring 94 closes the lower end of the chambers 76 and 86. The cover plate 92 may be secured to the block by screws (not shown) or alternatively may be welded to the block to permanently seal the bottom thereof. Other means, such as threaded plugs, could also be used to close the bottoms of the chambers.

To stabilize the horizontal position of the block 20 and to prevent axial movement of the pressure pickup head with respect to the plug 26, a pair of screws 96 are provided which pass slidably through bores 98 in the block adjacent each end thereof. The screws 96 are provided with nuts 100 which when tightened, advance the pointed inner ends of the screws into penetrating engagement with the outer walls of the tank, thereby firmly seating the shoulder 36 of the pressure pickup head against the inner surface of the drain plug 26, preventing axial movement of the pickup head with respect to the plug, and preventing the rotation of the block. As shown for example in FIG. 4, the screws 98 should be sufficiently long so that the heads thereof do not seat against the block in the tightened condition of the nuts 100.

The gauge glass assembly 22 comprises square upper and lower end plates 102 and 104 which are secured in spaced parallel alignment by a pair of side angle members 106 and 108 attached thereto by screws 110 (FIGS. 3 and 7). The gauge glass assembly is mounted on the block 20 by means of a downwardly extending neck portion 112 of the lower end plate 104 which is threadedly engaged with the threaded upper end of the bore 88 of the block. The upper end plate 102 includes an upwardly extending neck portion 114 which is connected to bracket 116 by means of screw 118 adjustably mounted within slot 120 of the bracket. An angled end of the bracket is attached to the tank wall 16 by means of screw 122 threadedly connected with a bore 124 in the tank. A seal ring 126 prevents fuel leakage around the screw 122. The bracket 116 is an optional feature and may not be required, especially with relatively shallow fuel tanks and a correspondingly short gauge glass assembly.

An armored transparent cylinder 128 preferably of polycarbonate extends between the upper and lower end plates 102 and 104, being slidably seated within an annular groove 130 in the lower plate 104 and a circular slot 132 in the upper plate 102. The cylinder 128 in conjunction with the side angle plates 106 and 108 forms a pair of viewing windows at each side of the gauge assembly through which the gauge may be viewed. The cylinder 128 may be rotated to expose new viewing surfaces thereof, should the viewing windows become obscured by dirt, oil or other foreign matter.

Concentrically disposed within the cylinder 128 is a glass capillary tube 134 preferably of heat and chemical resistant glass such as that sold under the trademark Pyrex. The capillary tube is resiliently secured at its lower end within a bore 136 of the end plate 104 by seal ring 138. Similarly, at its upper end, the capillary tube is disposed within bore 140 of upper end plate 102 and sealed therewithin by a seal ring 142. The lower end of the capillary glass tube is connected by passage 144 with the second reservoir chamber 86. A passage 145 connects the upper end of bore 140 with the interior of the cylinder 128, which, since it is not sealed, effectively exposes the upper end of the capillary tube to atmospheric pressure. A liquid check valve assembly within bore 140 above the capillary tube end comprises a soft rubber ball 146 adapted to seat within the bore end. A larger ball 147 disposed beneath ball 145 is of a density such as to float in the indicator fluid and may for example be made of polypropolene. Ball 147 is supported by spring retainer clip 147a in a normal rest position which allows ball 146 to open passage 145 and permits air to pass to and from the bore 140 from within cylinder 128.

Vertical gauge scale support members 148 and 150 extend virtually the full length of the capillary tube between upper and lower circular disks 152 and 154, being attached to the disks such as by spot welding. As shown in FIG. 7, the scale support members include angularly formed side edges to provide rigidity. A vertical pin 156 secured in the upper end plate 102 passes through a hole in the upper disk 152 to prevent rotation of the gauge scale support members 148 and 150 when the cylinder 128 is rotated. The pin 156 accordingly anchors the gauge scale support members in a position facing the windows formed by the side angle elements 106 and 108. The angled edges of the scale support members frictionally engage the cylinder 128, preventing its rotation except when manually turned.

Gauge scale strips 158 and 160 are attached to the scale support members 148 and 150 by bolts 162. Since locomotive fuel tanks vary in capacity and since the volume of fuel contained in the tank usually does not correspond linearly with the depth of the fuel in the tank, the gauge scale strips will be different for each model tank to which the gauge assembly is applied. Accordingly, the scale strips 148 and 150 are made separate from the support members to permit installation of gauge scale strips having indicia printed thereon which are suited for the tank on which the gauge is mounted.

The installation of the fuel gauge to a tank involves simply the drilling of the bore 30 in the drain plug 26, the placement of the pressure sensing head 32 into the bore 30 and the connection of the extending threaded end 40 of the pressure sensing head with the bore 46 of the block 20. The latter operation is accomplished by means of a wrench applied to the hexagonal portion of the sensor. The plug 26 is then screwed into the tank and tightened into sealing relation therewith. Since the plug may rotate with respect to the pressure sensing head 32, the block 20 is held horizontal during the final tightening of the plug. The nuts 100 on the screws 96 are then tightened to seat the points of the screws in penetrating relation with the tank wall, thereby anchoring the block in a horizontal position.

Prior to installation of the gauge assembly 22, with the cover plate 92 and the plug 54 secured in sealing relation, and with the vent screw 72 removed and the valve 64 closed, an indicator liquid is added to the first and second reservoir chambers 76 and 86. Although the indicator liquid could be added through the vent screw bore 68 after the installation of the gauge glass assembly 22, it is considerably easier to add the liquid through the top of the bore 88 with the gauge glass assembly removed. The indicator liquid should have a specific gravity heavier than the fuel in the tank, should have a color readily visible in the capillary tube, and must be immiscible with respect to the fuel. A preferred indicator fluid comprises a solution formed from glycol, water and a dye, which combination is heavier than diesel fuel and immiscible with respect thereto.

After the indicator fluid has been added to the block to substantially fill the chambers 76 and 86, the gauge assembly 22 is screwed into place in the top of the bore 88 and the bracket 116 is connected to the upper end thereof by means of screw 118. As indicated above, the bracket 116 is an optional feature, and, depending on the height of the gauge glass assembly, may not be necessary.

For operation of the fuel gauge, the vent screw 72 is replaced to seal the vent passage 68 and, with fuel present in the tank 12, the valve 64 is opened to permit fuel to flow from the tank through the holes 42 and bore 44 of the pressure sensing head into the bore 46, passage 50, bore 52, passage 56 and into the chamber 58, thence into the upper end of the first reservoir chamber 76. Since the fuel is lighter than the indicator fluid, and since the fuel and the indicator fluid are immiscible, an interface 170 between the two liquids will form in the first chamber 76. The pressure of the fuel at the interface, which is proportional to the fuel level in the tank, displaces the indicator fluid in the adjoining chamber 86 in view of the connecting passage 90 and forces the fluid from chamber 86 up into the capillary tube 134, thereby producing a visual indication of the contents of the tank. The gauge accordingly works on the principle of a manometer except that a liquid pressure rather than a gas pressure is sensed and indicated by the indicator liquid. Inasmuch as the tank and the upper end of the capillary tube are open to atmospheric pressure, the indicator fluid will move until the weights of the columns of fuel and indicator liquid are equal.

Since the indicator liquid has a greater specific gravity than that of the fuel, the fuel level in the tank will always be higher than the indicating level of the indicator liquid. For example, as shown in FIG. 6, an indicator liquid level of 172 in the gauge results from a fuel level in the tank at 174. The gauge assembly 22 thus need not extend the full height of the tank which is an advantage with the extremely large fuel tanks found on locomotives.

Since air is likely to become trapped in the upper part of the first chamber upon the initial filling of the chamber with fuel, steps should be taken to vent the air to prevent a distortion of the indicator liquid reading in the gauge. This can be accomplished by opening the vent screw 72 as the fuel enters the chamber to allow air and fuel to bubble through the vent passage. The vent screw is then closed to permit the full fuel pressure to bear at the interface on the indicator liquid. The valve is then closed and the vent screw opened to permit the indicator liquid in the gauge to drop to a balanced condition, forcing fuel and air from the upper part of the first chamber. The vent screw is then closed and the valve reopened to permit normal gauge operation.

It is important that the volume of indicator liquid in the first chamber be sufficient to accommodate the empty volume of the capillary tube and the upper part of the second chamber when the tank is in the filled position without permitting the interface level to approach the bottom of the first chamber and specifically the passage 90 between the first chamber and the second chamber. Should the interface level drop too low in the first chamber, there is a danger that the lighter fuel may pass into the second chamber and climb to the top of the indicator liquid column in the capillary tube. This would add to the weight of the column of indicator fluid and produce an erroneous reading. The volume of the second chamber is relatively unimportant but should be at least equal to the volume of the capillary tube and is preferably three to four times the volume of the capillary tube.

Since locomotive fuel tanks are filled rapidly, the pressure at the bottom of the tank may surge during filling to a pressure greater than the full tank pressure, thus sending the gauge indicator liquid above the top of the capillary tube. The liquid check valve assembly will close the passage 145 under such circumstances to prevent loss of indicator liquid, the floating ball 147 moving upwardly with the rising liquid and causing ball 146 to close the passage 145.

The construction of the gauge glass assembly permits the reading of the fuel quantity in the tank on any one of four gauge scale strips. With the arrangement shown in FIGS. 1-3, for example, the gauges 14 may each be read from either side of the locomotive. The indicator fluid will be clearly visible whether the predominent lighting is from the front or the rear of the gauge. The scale strips will remain clean and easily read since they are protected behind the transparent cylinder 128. Should the cylinder become dirty, it may be easily rotated to move clean sections thereof into the viewing windows formed by the side angles 106 and 108.

The use of two gauges 14 as shown in FIGS. 1 and 2 permits a very accurate gauging of the fuel quantity in the tank regardless of the grade or angle of bank of the track at the point where the reading is taken. By spacing the two gauges diametrically with respect to the center of the tank as shown in FIG. 2, an accurate fuel quantity is found by halving the sum of the readings of the two gauges.

In the event of breakage of the gauge glass assembly, a somewhat unlikely occurrence in view of its armored construction, only a negligible quantity of fuel would be lost through the broken capillary since the aperture provided by the needle valve need only be very small to provide an accurate fuel pressure at the interface in the first chamber. By simply closing the valve, the gauge glass assembly may be replaced without the need for draining the tank. Fuel in the first and second chambers may be removed simply by rotating and inverting the block after the nuts 100 have been loosened, following which the block is restored to its horizontal position, new indicator fluid added, and a new gauge glass assembly installed.

I claim:

1. A gauge for indicating the level of a liquid in a tank comprising a block disposed exteriorly of said tank adjacent the bottom thereof, a first chamber in said block, a liquid passage means connecting the bottom of said tank with an upper region of said first chamber, a second chamber in said block, passage means at the bottom of said first and second chambers connecting the bottoms of said first and second chambers, a gauge glass extending above said block, means connecting said gauge glass with said second chamber, and an indicator liquid in said first and second chambers, said indicator liquid having a specific gravity heavier than that of the liquid of said tank and being immiscible with respect thereto, the initial introduction of liquid into said tank resulting in the entrance of said liquid into said first chamber and producing an interface with the heavier immiscible indicator liquid, the volume of indicator liquid in said chambers being sufficient to assure the maintaining of the interface level above said passage means for any liquid level of said tank, said indicator liquid passing from said second chamber into said gauge glass upon the introduction of a predetermined quantity of liquid into said tank to provide a visual indication of the quantity of liquid in said tank.

2. The invention as claimed in claim 1 including valve means for controlling liquid flow through said means connecting the bottom of said tank with an upper region of said first chamber.

3. The invention as claimed in claim 2 including vent means connected to an upper region of said first chamber for selectively venting the chamber.

4. The invention as claimed in claim 1 wherein said means connecting the bottom of said tank with an upper region of said first chamber comprises a drain plug disposed adjacent the bottom of said tank, and passage means in said drain plug.

5. The invention as claimed in claim 1 wherein said gauge glass comprises a capillary tube.

6. The invention as claimed in claim 5 including an armored transparent cylinder surrounding said capillary tube in concentric spaced relation thereto.

7. The invention as claimed in claim 6 including angle members disposed in opposed relation adjacent said cylinder and partially covering said cylinder to provide a pair of opposed windows through which the capillary tube may be observed.

8. The invention as claimed in claim 7 wherein said cylinder may be rotated with respect to said angle members and said capillary tube to present a clean viewing area at said windows.

9. The invention as claimed in claim 8 including means for supporting a gauge scale adjacent said capillary tube interiorly of said cylinder.

10. The invention as claimed in claim 8 including means for supporting a gauge scale at opposite sides of said capillary tube facing each of said windows.

11. The invention as claimed in claim 1 wherein said indicator liquid comprises a mixture of water, glycol, and dye.

12. The invention as claimed in claim 1 including a liquid check valve at an upper end of said gauge glass, said check valve permitting air flow into and out of said gauge glass but preventing indicator fluid from escaping therefrom.

13. A fuel gauge for providing a visual indication of the quantity of diesel fuel in the fuel tank of a locomotive, said tank including a drain plug adjacent the bottom thereof, comprising a block disposed exteriorly of a side of said tank adjacent to and connected to the drain plug thereof, a first chamber in said block, passage means passing through said drain plug connecting the bottom of said tank with an upper region of said first chamber, a second chamber in said block, passage means connecting the bottoms of said first and second chambers, a capillary tube extending above said block, means connecting said capillary tube with said second chamber, and an indicator liquid in said first and second chambers, said indicator liquid having a specific gravity greater than that of the diesel fuel of said tank and being immiscible with respect thereto, the initial introduction of fuel into said tank resulting in the introduction of fuel into said first chamber and the creation of an interface in said first chamber between said fuel and the heavier immiscible indicator liquid, the volume of indicator liquid in said chambers being sufficient to assure the maintaining of the interface level above the passage means connecting the first and second chambers for any fuel quantity in said tank, said indicator liquid being displaced from said second chamber into said capillary tube by the pressure of the fuel acting on the indicator liquid-fuel interface in said first chamber to provide a visual indication of the fuel quantity in said tank.

14. The invention as claimed in claim 13 including valve means for controlling liquid flow through said passage means connecting the bottom of said tank with an upper region of said first chamber.

15. The invention as claimed in claim 13 including vent means connected to an upper region of said first chamber for selectively venting the chamber.

16. The invention as claimed in claim 13 including an armored transparent cylinder surrounding said capillary tube in concentric spaced relation thereto.

17. The invention as claimed in claim 16 including angle members disposed in opposed relation adjacent said cylinder and partially covering said cylinder to provide a pair of opposed windows through which the capillary tube may be observed.

18. The invention as claimed in claim 17 wherein said cylinder may be rotated with respect to said angle members and said capillary tube to present a clean viewing area at said windows.

19. The invention as claimed in claim 18 including means for supporting a gauge scale adjacent said capillary tube interiorly of said cylinder.

20. The invention as claimed in claim 18 including means for supporting a gauge scale at opposite sides of said capillary tube facing each of said windows.

21. The invention as claimed in claim 13 wherein said indicator liquid comprises a mixture of water, glycol, and dye.

22. The invention as claimed in claim 13 including a liquid check valve at the upper end of said capillary tube, said check valve permitting air flow into and out of said capillary tube but preventing indicator fluid from escaping therefrom.

* * * * *